Patented Aug. 8, 1950

2,518,283

UNITED STATES PATENT OFFICE 2,518,283

PRODUCTION OF POLYETHYLENE TEREPHTHALATE

Edward Francis Casassa, Buffalo, N. Y., assignor to E. I. du Pont de Nemours & Company, Wilmington, Del., a corporation of Delaware No Drawing. Application July 29, 1948, Serial No. 41,397

3 Claims. (Cl. 260—75)

This invention relates to an improved method for preparing a synthetic linear polyester which is essentially the condensation product of a dihydric alcohol and a dibasic acid, and more particularly to the preparation of polyethylene terephthalate, a fiber-forming synthetic linear polyester.

The production of the novel class of fiberforming, linear polyesters of terephthalic acid and a glycol of the series $HO(CH_2)_nOH$ where $n$ is an integer from 2 to 10 inclusive, is fully disclosed in copending Whinfield and Dickson application Serial No. 618,398, filed September 24, 1945, now U. S. Patent No. 2,465,319. From the commercial standpoint one of the most attractive polymers of this class is polyethylene terephthalate, and the most promising process for its production comprises carrying out an ester interchange between ethylene glycol and dimethyl terephthalate to form bis-2-hydroxy-ethyl terephthalate monomer which is polymerized to polyethylene terephthalate under reduced pressure (below atmospheric pressure) and at elevated temperatures.

However in the practice of this process it was observed that highly purified dimethyl terephthalate and highly purified ethylene glycol were very sluggish with respect to ester interchanging. It was noted that less finely purified reagents would more readily undergo the ester interchange, but the reaction was still slow. The intrinsic viscosities of the resulting polymers ranged from 0.30, after a three-hour vacuum cycle at 260° C., to 0.60 after a twenty-two hour vacuum cycle at 260° C. Because of this slow rate of reaction, it was essential, for commercial operations, to have a catalyst to push the speed of reaction up into the realm of that considered necessary for economic purposes.

Many catalytic materials have been suggested and found useful, especially for the ester interchange reaction. Some of these are sodium, lithium, potassium, calcium, magnesium, zinc, cadmium, manganese, etc. as well as alkali metals in the form of their carbonates or other alkalinereacting salts, for example the borates; also the oxides of various of these metals were useful catalysts. These catalysts, however, are not useful over the entire range of molecular weights desired in the final polymer, and of course, are not necessarily catalysts for both the ester-interchange and the condensation reaction.

An object of this invention therefore, is to suitably accelerate by catalysis the reactions involved in the production of fiber-forming linear polyester from ethylene glycol and dimethyl terephthalate.

Another object is to prepare from ethylene glycol, and dimethyl terephthalate, by a simple and economical expedient, a synthetic linear polyester having an excellent whiteness, low degree of solubility in organic solvents, and having the further characteristic property when formed into filaments of being capable of being cold drawn to the extent of at least 2 times the original filament length to form useful textile fibers of great strength and pliability. These and other objects will more clearly appear hereinafter.

Unexpectedly I have found that the ester interchange between ethylene glycol and dimethyl terephthalate, and the subsequent polymerization of the resulting bis-2-hydroxy-ethyl terephthalate under super polyester-forming conditions is accelerated to a satisfactory degree in the presence of catalytic amounts of zinc borate $$(3ZnO.2B_2O_3)$$

to form, in good yield, a fiber-forming, linear polyethylene terephthalate of excellent purity. Accordingly the present invention comprises reacting ethylene glycol and dimethyl-terephthalate at atmospheric pressure and at elevated temperatures in the presence of catalytic amounts of zinc borate to form methanol and ethylene terephthalate monomer and thereafter heating said monomer at still higher temperatures and under reduced pressure, in the presence of zinc borate as catalyst, to form polyethylene terephthalate with the elimination of glycol. The polymerization step is continued until a fiberforming polymer of the desired intrinsic viscosity, i. e., degree of polymerization, is obtained.

The expression "intrinsic viscosity," denoted by the symbol $(\eta)_0$, is used herein as a measure of the degree of polymerization of the polyester and may be defined as:

$$\text{limit } \ln\frac{(\eta_r)}{C} \text{ as } C \text{ approaches } 0$$

wherein $\eta_r$ is the viscosity of a dilute phenoltetrachlorethane (60:40) solution of the polyester divided by the viscosity of the phenol-tetrachlorethane mixture per se measured in the same units at the same temperature, and $C$ is the concentration in grams of polyester per 100 cc. of solution.

Zinc borate ($3ZnO.2B_2O_3$) may be used in many different catalyst concentrations. In general, it may be used in amounts ranging from .05% to 0.2% (based on dimethyl terephthalate). Within this range, it may be stated that the larger amounts of catalyst result in a shorter reaction time, i. e. a higher intrinsic viscosity polymer is produced more quickly. In general, it will not be advisable to use a catalyst concentration in excess of 0.2%, since above that concentration excessive thermal degradation takes place, i. e. the irreversible degradation occurs at a faster rate than the condensation reaction.

The initial condensation which may be regarded as essentially a simple ester interchange in accordance with the following reaction:

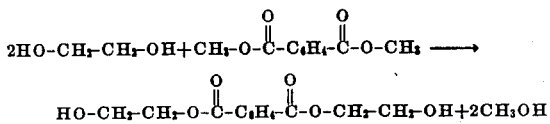

may be conveniently carried out at atmospheric pressure and at a temperature range between 140°–220° C., and preferably between 150°–200° C. Of course, the reaction may be carried out under pressures above or below atmospheric pressure, if desired. However, it can readily be seen that an economic advantage resides in conducting the reaction at atmospheric pressure.

The polymerization reaction may be effected in either the liquid (i. e., melt) or solid phase. In the liquid phase the reaction must be carried out at reduced pressure in the vicinity of 0.01-20 millimeters of mercury with the range 0.01-5.0 mm. Hg preferred for optimum results. This reduced pressure is necessary to remove the free ethylene glycol which emerges from the polymer as a result of the condensation reaction, since the reaction mixture is very viscous. If reduced pressure is not used, all of the ethylene glycol will not be removed, and it will not be possible to form a fiber-forming polymeric material, but rather a low molecular weight polymer, too brittle for fibers. A temperature between about 230° to about 290° C. and preferably between about 260° to about 275° C. should be maintained during the polymerization step. Since low temperatures necessitate an excessive length of time, the higher temperatures within the preferred range will generally be used in commercial operations.

The ester interchange portion of the reaction usually takes from 1 to 5 hours. The polymerization cycle, however, may take longer, generally being from 1-10 hours after a full vacuum has been achieved. The actual length of time depends upon several conditions, such as catalyst concentration, temperature, intrinsic viscosity desired, amount of color allowable in the finished polymer and many other such items. In general, it is desired not to have too long a polymerization cycle, both for economic reasons and since in a polymerization cycle that is too long, the competing and irreversible thermal degradation reaction will have sufficient time to lower the intrinsic viscosity more than the polymerization reaction can raise it.

The following examples further illustrate the principle and practice of this invention and demonstrate the advantages thereof. Parts and percentages are by weight unless otherwise indicated.

In each of Examples 1 thru 6, the reaction is carried out as follows: to 1000 parts of dimethyl terephthalate and 1000 parts of ethylene glycol in a glass-lined reaction vessel is added an amount of catalyst as shown in the table below. The reaction vessel is then heated to the vicinity of 210° C. and held at that temperature until the ester interchange is completed. The point of completion of the ester interchange is indicated by the cessation of the evolution of methanol. Heating is then continued at a temperature as shown in the table and at the same time a vacuum is drawn on the reaction vessel. The time of the polymerization cycle is shown in the table below, the starting point being taken as that point at which a pressure is reached in the reaction vessel in the vicinity of 1 mm. Hg. At the end of the polymerization cycle the polymeric material is cooled and after solidification determinations are made for intrinsic viscosity.

| Example | Per Cent Zinc borate [1] | Time (hrs.) | Temp. | Intrinsic Viscosity |
|---|---|---|---|---|
| Control | None | 3.5 | 283 | 0.48 |
| 1 | 0.05 | 3.8 | 275 | 0.73 |
| 2 | 0.1 | 2.5 | 272 | 0.72 |
| 3 | 0.20 | 1.2 | 275 | 0.74 |
| 4 | 0.30 | 1.8 | 273 | 0.71 |
| 5 | 0.10 | 3.8 | 265 | 0.73 |
| 6 | 0.08 | 3.9 | 284 | 0.70 |

[1] Based on weight of dimethyl terephthalate.

To demonstrate that the improvement obtained by the use of the modifiers of this invention is not restricted to any one process of polymerization, the following example of solid phase polymerization is illustrative:

Example 7

A low molecular weight "half-made" polymer (intrinsic viscosity of 0.2) is prepared from dimethyl terephthalate and ethylene glycol using 0.05% zinc borate ($Zn_3B_4O_9$) as catalyst by the process of the previous examples. This polymer is then cooled to a brittle solid which is ground and the material ranging from 42–100 mesh in particle size is placed in a jacketed tube. The temperature of the polymer is raised to the vicinity of 243° C. and at the same time the polymer is placed under a reduced pressure of .05 mm. mercury. The condensation was allowed to continue in the solid phase under static bed conditions for 5 hours. The resulting polymer exhibited an intrinsic viscosity of 0.7.

By using the catalyst of this invention, it is possible to prepare fiber-forming polyethylene terephthalate of suitable intrinsic viscosity within a rather short period of time. For example, by using 0.20% concentration at 275° C., a polymer having an intrinsic viscosity of 0.7 may be obtained by the melt process with a vacuum cycle as short as 1.4 hours. This is considered a very fast polymerization time in the field of high polymers, since normally these reactions proceed rather slowly due to the very high viscosities of the polymeric materials.

Another advantage of this invention is the fact that a very white polymeric material is obtained using the zinc borate catalyst. This advantage, while it may seem of relative unimportance, is actually a very critical factor. The reason being that in the textile industry the universal desire is for an inherently white fiber or yarn that can be colored as desired. It is especially undesirable to have a yarn that is off-color as spun, since this necessitates an additional step such as bleaching if a white material is desired. Also, it will tend to give off-color shades when dyed, since the textile material is off-color.

As stated hereinabove polyethylene terephthalate is the preferred polymer and the present invention has been described with particular reference to this polymer. However, zinc borate also effectively catalyzes the ester interchange between ethylene glycol and terephthalate esters of saturated aliphatic monohydric alcohols containing up to and including four carbon atoms, e. g., diethyl, dipropyl, and dibutyl terephthalates.

As many widely different embodiments can be made without departing from the spirit and scope of my invention it is to be understood that said invention is not to be restricted in any way except as set forth in the appended claims.

I claim:

1. In the process for producing fiber-forming polyethylene terephthalate wherein ethylene glycol is reacted with dimethyl terephthalate to form by ester interchange, bis-2-hydroxy-ethyl terephthalate, and the bis-2-hydroxyl-ethyl terephthalate is thereafter polymerized to a fiber-forming linear polymer by heating the same under sub-atmospheric pressure until a linear polymer of the desired intrinsic viscosity is obtained, the improvement which comprises effecting the ester interchange and polymerization in the presence of zinc borate as a catalyst.

2. A process for producing fiber-forming polyethylene terephthalate which comprises reacting ethylene glycol and dimethyl terephthalate in the presence of a catalytic amount of zinc borate at a temperature of from 140° to 220° C. until no further methanol is liberated, and thereafter continuing reaction in the presence of said zinc borate at a temperature of from 230° to 290° C., and at a pressure of from 0.1 to 20 millimeters of mercury until a fiber-forming linear polyester of the desired intrinsic viscosity is obtained.

3. The process of claim 2 wherein from 0.05% to 0.2% by weight of zinc borate, based on the weight of dimethyl terephthalate is used as catalyst.

EDWARD FRANCIS CASASSA.

REFERENCES CITED

The following references are of record in the file of this patent:

FOREIGN PATENTS

| Number | Country | Date |
|--------|---------|------|
| 590,417 | Great Britain | July 17, 1947 |
| 590,451 | Great Britain | July 17, 1947 |